F. A. LUBRECHT.
WHIFFLETREE.
APPLICATION FILED MAR. 24, 1910.

1,016,425.

Patented Feb. 6, 1912.

Witnesses

Ferdinand A. Lubrecht
Inventor.

by C. A. Snow & Co.
Attorneys

COLUMBIA PLANOGRAPH CO., WASHINGTON, D. C.

UNITED STATES PATENT OFFICE.

FERDINAND A. LUBRECHT, OF PINE CITY, MINNESOTA.

WHIFFLETREE.

1,016,425.  Specification of Letters Patent.  Patented Feb. 6, 1912.

Application filed March 24, 1910. Serial No. 551,309.

*To all whom it may concern:*

Be it known that I, FERDINAND A. LUBRECHT, a citizen of the United States, residing at Pine City, in the county of Pine and State of Minnesota, have invented a new and useful Whiffletree, of which the following is a specification.

It is the object of the present invention to improve the construction of draft appliances and more specifically the construction of swingle trees, and the invention aims primarily to provide a swingle tree so constructed that it may be reversed without detachment of the traces or trace chains and without disconnection from the vehicle to which it is attached.

The invention aims further to provide, in a draft appliance of this class, whether it be a swingle tree or a double tree, means for strengthening the tree both at its ends and at its intermediate portion so that the tree will be prevented from snapping off at either side of its middle, and the reversible feature of the invention permits of its position being changed in the event that it starts to split or become bent.

Figure 1:
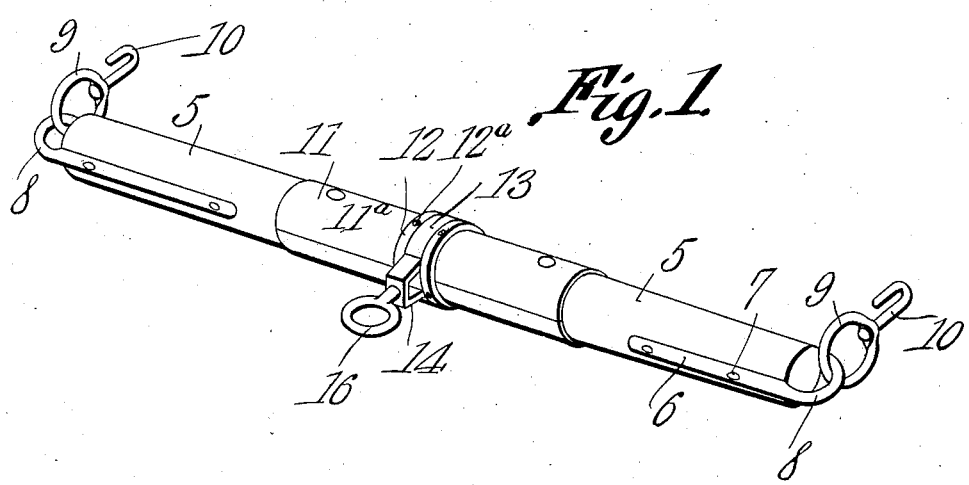
Figure 2:
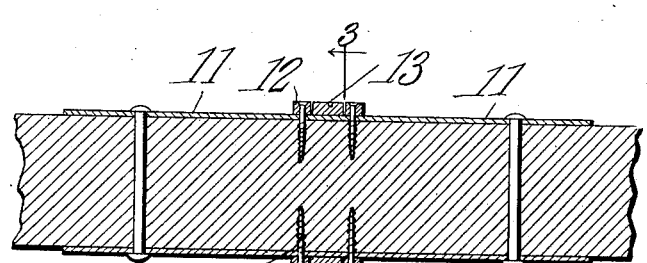
Figure 3:
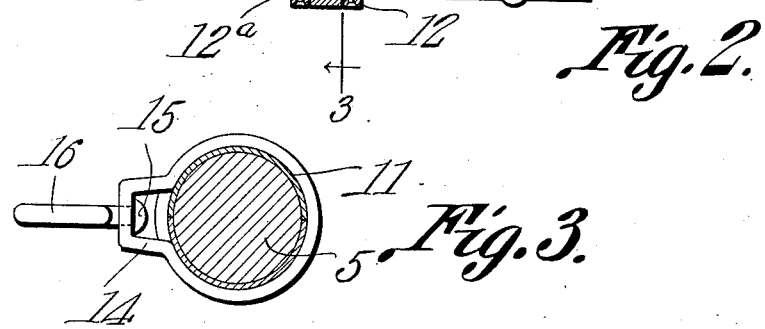

In the accompanying drawings,—Figure 1 is a perspective view of the draft appliance embodying the present invention. Fig. 2 is a vertical longitudinal sectional view through the intermediate portion thereof, and Fig. 3 is a vertical sectional view on the line 3—3 of Fig. 2.

In the drawings, the body of the swingle tree is indicated by the numeral 5 and is of wood and of the ordinary cylindrical form. A rod is flattened from each of its ends to a point near its middle and bent upon itself to afford spaced straps 6 between which is received one end of the body 5, the straps beign secured to the said body, as indicated at 7 in Fig. 1 of the drawings. The intermediate part of the rod, or in other words, its bend is indicated by the numeral 8 and is so spaced from the corresponding extremity of the body as to afford an eye with which is loosely engaged a ring 9 having swiveled thereto a hook 10 with which may be connected the trace chain in the instance of a swingle tree, and in the event that the improvements are embodied in a double tree, swingle trees of the ordinary or of like construction may be connected with these hooks.

Substantially semi-cylindrical members 11 are disposed with their edges in registration about the body 5 of the swingle tree at its intermediate portion and secured there by nails or screws 11$^a$, thus forming a sleeve and closing the body, and secured by nails or screws 12$^a$ around said sleeve at a point midway between the ends of the swingle tree are collars, indicated by the numeral 12 of sufficient diameter to pass over the straps 6, these collars being spaced and receiving between them a ring 13 of sufficient diameter to pass over the straps 6 which is rotatable about the said swingle tree and is provided with a loop 14 projecting rearwardly and housing the head 15 of a swiveled eye 16.

It will be readily understood from the foregoing that the sleeve members 11 serve to prevent wear on and to strengthen the intermediate part of the swingle tree, and that the strap portions 6 serve to strengthen the ends of the said tree. It will further be understood that while the body of the tree is thus materially reinforced and strengthened and there is little likelihood of its becoming broken, should it begin to split while in actual use the entire tree may be reversed within the ring 13 by turning over or rotating the body 5 about its longitudinal axis, the swiveled hooks 10 and the loose engagement of the rings 9 with the eyes 8 permitting of such reversal of the swingle tree body without the necessity of disengagement of the trace chains from the said hooks 10 and also without the necessity of disconnecting the swingle tree from the vehicle or implement for which it is the draft connection. The reinforcement of the wooden body 5 effected by the members 11 of the sleeve also takes off of said body the frictional wear due to the constant movements of the ring 13, and if the sleeve should become unduly worn at one side from this cause the body (and with it the sleeve) can be reversed as above described. It will be observed that the semi-cylindrical sleeve sections 11 meet each other edge to edge instead of lapping each other, and thereby present a smooth exterior surface around which the ring may rotate freely.

What is claimed is:

In a whiffletree, the combination with a wooden cylindrical body, straps secured to the extremities thereof, eyes secured to the said straps, and hooks loosely engaging said eyes; of a sleeve comprising two semi-cylindrical members loosely embracing said body at the center of its length and meeting each other edge to edge, means for securing them thereto, two spaced collars of sufficient diameter to pass over the straps surrounding and inclosing the sleeve members, means for securing them thereon, a metallic eye of sufficient diameter to pass over the straps loosely mounted around the sleeve between said collars, and having an off-setting loop, and an eye having a head within said loop and swivelly connected with said loop.

In testimony that I claim the foregoing as my own, I have hereto affixed my signature in the presence of two witnesses.

FERDINAND A. LUBRECHT.

Witnesses:
J. ADAM BEDE,
E. A. DOSEY.

Copies of this patent may be obtained for five cents each, by addressing the "Commissioner of Patents, Washington, D. C."